United States Patent
Corredor Ortega et al.

(10) Patent No.: US 12,339,878 B2
(45) Date of Patent: Jun. 24, 2025

(54) SYSTEMS AND METHODS FOR REGION-BASED SEGMENTATION OF A KNOWLEDGE BASE DEVELOPED USING DATA COLLECTED FROM MYRIAD SOURCES

(71) Applicant: RED ATLAS INC., San Juan, PR (US)

(72) Inventors: Oscar David Corredor Ortega, Bogota (CO); Henry Forsyth Keenan, San Juan, PR (US); Andrés Felipe Valencia Duque, Pereira (CO); Juan David Martínez Castillo, Cartago (CO); Alejandro Dominguez Rosales, Bogota (CO); Andrés Pérez Buriticá, Bogota (CO); Jose Martinez, San Juan, PR (US)

(73) Assignee: Red Atlas Inc., San Juan, PR (US)

( * ) Notice: Subject to any disclaimer, the term of this patent is extended or adjusted under 35 U.S.C. 154(b) by 0 days.

(21) Appl. No.: 18/763,804

(22) Filed: Jul. 3, 2024

(65) Prior Publication Data
US 2025/0013672 A1     Jan. 9, 2025

Related U.S. Application Data

(60) Provisional application No. 63/511,773, filed on Jul. 3, 2023.

(51) Int. Cl.
*G06F 16/00* (2019.01)
*G06F 16/215* (2019.01)
(Continued)

(52) U.S. Cl.
CPC ............ *G06F 16/29* (2019.01); *G06F 16/215* (2019.01); *G06F 16/243* (2019.01);
(Continued)

(58) Field of Classification Search
CPC ...... G06F 16/29; G06F 16/243; G06F 16/248; G06F 16/215; G06F 16/24575; G06F 16/287
See application file for complete search history.

(56) References Cited

U.S. PATENT DOCUMENTS

2007/0250855 A1* 10/2007 Quinn-Jacobs ........ G06Q 30/02
                                                                725/35
2008/0016040 A1    1/2008 Jones
(Continued)

FOREIGN PATENT DOCUMENTS

WO         2023072400 A1    5/2023

OTHER PUBLICATIONS

Xie et al. "A Prompt Log Analysis of Text-to-Image Generation Systems." Proceedings of the ACM Web Conference 2023. 2023. pp. 1-11.

(Continued)

*Primary Examiner* — Dinku W Gebresenbet
(74) *Attorney, Agent, or Firm* — Nixon Peabody LLP

(57) ABSTRACT

A system is configured to: (a) receive multi-modal data from one or more sources, the multi-modal data including text data; (b) analyze the data to determine features; (c) store the features in a database; (d) receive a search query for searching the stored features; (e) analyze the search query using a large language model to extract search features; (f) generate search results from the search features; and (g) display search results on a standardized graphical user interface including (i) a map and (ii) a legend having at least one or more of the search features displayed.

20 Claims, 6 Drawing Sheets

(51) Int. Cl.
  *G06F 16/242* (2019.01)
  *G06F 16/2457* (2019.01)
  *G06F 16/248* (2019.01)
  *G06F 16/28* (2019.01)
  *G06F 16/29* (2019.01)
  *G06N 5/022* (2023.01)
  *G06N 5/04* (2023.01)

(52) U.S. Cl.
  CPC ...... *G06F 16/24575* (2019.01); *G06F 16/248* (2019.01); *G06F 16/287* (2019.01); *G06N 5/022* (2013.01); *G06N 5/04* (2013.01)

(56) References Cited

U.S. PATENT DOCUMENTS

| | | |
|---|---|---|
| 2009/0089149 A1 | 4/2009 | Lerner |
| 2009/0222438 A1 | 9/2009 | Strandell |
| 2014/0289323 A1 | 9/2014 | Kutaragi |
| 2016/0226904 A1 | 8/2016 | Bartos |
| 2017/0293611 A1* | 10/2017 | Tu ........................... G06F 16/48 |
| 2017/0293837 A1* | 10/2017 | Cosatto ................. G06V 20/64 |
| 2018/0052905 A1 | 2/2018 | Zhicharevich |
| 2018/0322597 A1 | 11/2018 | Sher |
| 2018/0364059 A1* | 12/2018 | Calinao ................. G06N 5/046 |
| 2018/0367506 A1 | 12/2018 | Ford |
| 2019/0318433 A1 | 10/2019 | Mcgee |
| 2019/0392587 A1 | 12/2019 | Nowozin |
| 2020/0349176 A1 | 11/2020 | Daimler |
| 2020/0357009 A1 | 11/2020 | Podgorny |
| 2022/0230716 A1 | 7/2022 | Lyman |
| 2023/0306541 A1 | 9/2023 | Bykau |
| 2024/0248765 A1 | 7/2024 | Scanlan |

OTHER PUBLICATIONS

International Search Report and Written Opinion issued in PCT/US24/36751, mailed Oct. 1, 2024 (18 pages).

First Office Action issued in U.S. Appl. No. 18/763,705, mailed Aug. 26, 2024 (36 pages).

First Office Action issued in U.S. Appl. No. 18/763,747, mailed Oct. 4, 2024 (25 pages).

* cited by examiner

SYSTEMS AND METHODS FOR REGION-BASED SEGMENTATION OF A KNOWLEDGE BASE DEVELOPED USING DATA COLLECTED FROM MYRIAD SOURCES

CROSS-REFERENCE TO RELATED APPLICATIONS

This application claims the benefit of and priority to U.S. Provisional Application No. 63/511,773, filed Jul. 3, 2023, which is hereby incorporated by reference herein in its entirety.

TECHNICAL FIELD

The present disclosure relates to information extraction and information management systems, and more specifically, to systems and methods for enriching databases with information from various data sources, including unstructured and incomplete data sources.

BACKGROUND

Information can be gathered at different granularity. Institutions rely on collected information to make decisions, for example, decisions relating to technology development, business, research, hiring, investments, etc. Similarly, individuals rely on information to make decisions as well, albeit on a smaller scale. With information explosion due to democratization of knowledge discovery, important data or material can be discovered in a first camp and yet is unavailable in a second camp. Individuals or institutions in the first camp can take advantage of the discovered data or material in making decisions, but individuals or institutions in the second camp cannot. Asymmetry in knowledge bases between the two camps illustrates that comparatively, the camp with access to incomplete information may be at a disadvantage. Alternatively, even when knowledge bases are similar between two camps, inability of one camp to incorporate available data can leave that camp at a disadvantage. In some situations, a camp is unable to incorporate available data due to the sheer size of data being generated by the information explosion. The present disclosure provides systems and methods for building knowledge bases and enriching these knowledge bases over time to improve accuracy and better inform decision making processes.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a system for building a knowledge base is provided. The system includes a processor. The system further includes a non-transitory computer-readable storage medium containing instructions which, when executed on the processor, causes the system to perform operations. The operations include receiving multi-modal data from one or more sources, the multi-modal data including text data; analyzing the data to determine features; storing the features in a database; receiving a search query for searching the stored features; analyzing the search query using a large language model to extract search features; generating search results from the search features; and displaying search results on a standardized graphical user interface including (i) a map and (ii) a legend having at least one or more of the search features displayed.

In an implementation, the graphical user interface further includes indications on the map showing one or more points of interest. In an implementation, the graphical user interface further includes indications on the map showing scores associated with regions on the map. In an implementation, the regions of the map are determined based on the search query. In an implementation, the search query includes keywords such as walkable. In an implementation, the regions of the map are determined based on amenities provided in the stored features. In an implementation, the regions of the map are determined based on prices provided in the stored features. In an implementation, the scores associated with the regions of the map are determined based on features included in corresponding regions. In an implementation, the system is further configured to generate a report comparing each of the regions on the map. In an implementation, each of the regions covers an area of the map including a single property. In an implementation, the system is further configured to generate one or more features for improving at least one of the regions on the map.

According to certain aspects of the present disclosure, a method for building a knowledge base includes receiving multi-modal data from one or more sources, the multi-modal data including text data; analyzing the data to determine features; storing the features in a database; receiving a search query for searching the stored features; analyzing the search query using a large language model to extract search features; generating search results from the search features; and displaying search results on a standardized graphical user interface including (i) a map and (ii) a legend having at least one or more of the search features displayed.

In an implementation, the graphical user interface further includes indications on the map showing one or more points of interest. In an implementation, the graphical user interface further includes indications on the map showing scores associated with regions on the map. In an implementation, the regions of the map are determined based on the search query. In an implementation, the search query includes keywords such as walkable. In an implementation, the regions of the map are determined based on amenities provided in the stored features. In an implementation, the regions of the map are determined based on prices provided in the stored features. In an implementation, the scores associated with the regions of the map are determined based on features included in corresponding regions. In an implementation, the method further includes generating a report comparing each of the regions on the map.

BRIEF DESCRIPTION OF THE DRAWINGS

The foregoing and other advantages of the present disclosure will become apparent upon reading the following detailed description and upon reference to the drawings.

Figure 1:
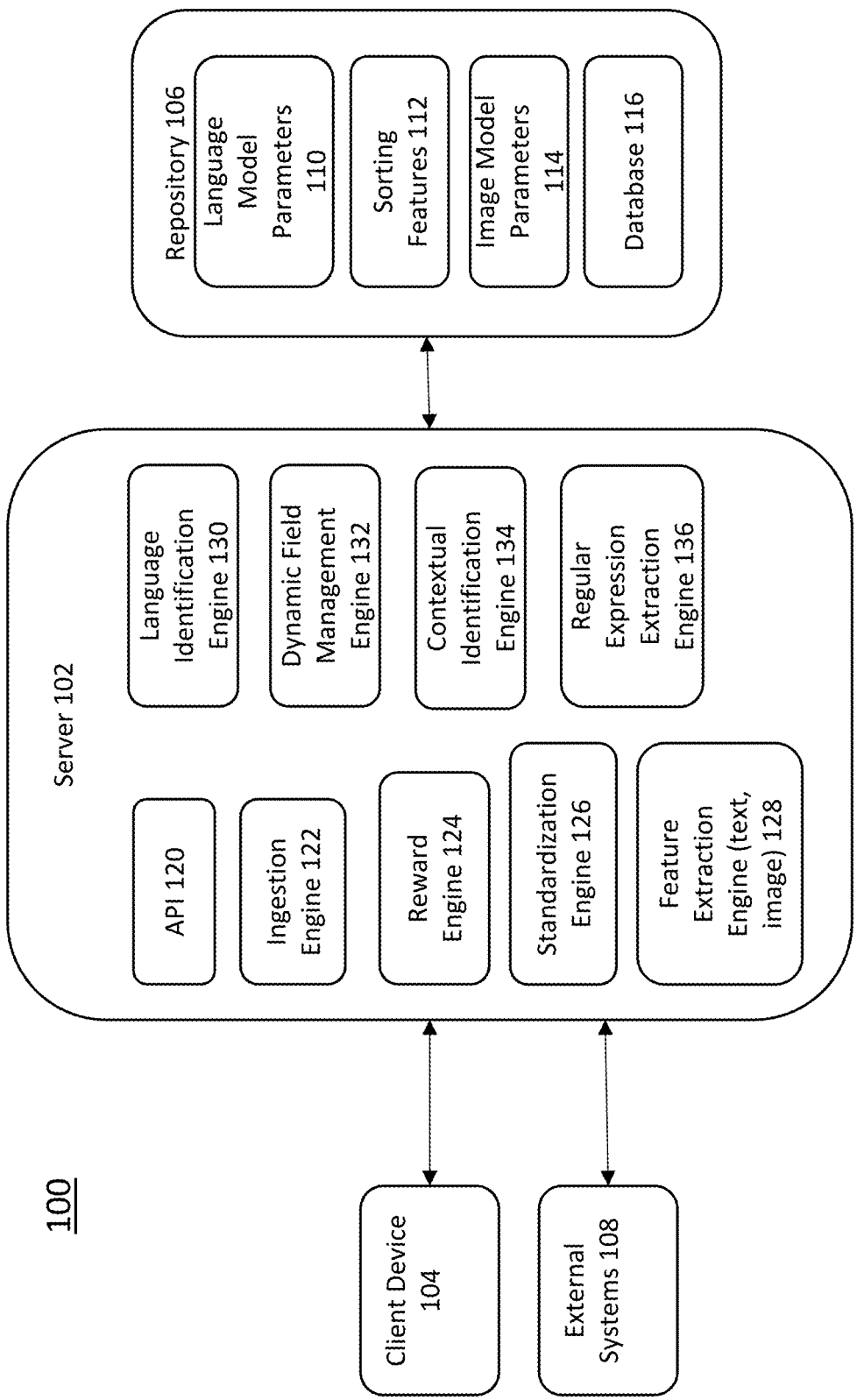
FIG. 1 illustrates a block diagram of a system for building knowledge bases and enriching databases, according to some implementations of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is intended to cover all modifications, equivalents, and alternatives falling within the spirit and scope of the present disclosure as defined by the appended claims.

DETAILED DESCRIPTION

With information explosion, there is a need for quickly and automatically ingesting data from different or various sources and using the ingested data in various systems or applications. For example, in a real estate scenario, homes or real-estate properties can be listed on listing website. Characteristics of the properties can differ. For example, commercial properties can have different characteristics of interest to buyers compared to residential properties. Access to local services (e.g., transportation services, parks, etc.) can differ between home buyers. New information about a listed home can be learned between a time the home is listed and a time a potential buyer views the home's listing. Without ways of incorporating the newly added information, the listing remains static.

Embodiments of the present disclosure provide an information management system that extracts data from various data sources and that can handle both structured and unstructured data. The information management system can standardize and enrich extracted data using machine learning and deep learning models. The information management system provides several advantages including:

1. handling complex and lengthy text descriptions that may include irrelevant information;
2. identifying and extracting relevant information from descriptions using deep learning models while overcoming limited vocabulary or string searches;
3. efficiently concatenating and standardizing extracted data from diverse sources, such as PDFs, images, and text;
4. obtaining data from unstructured text contexts, such as document titles and user comments;
5. accurately identifying categories and sub-categories for information provided in source data, despite potential inaccuracies in the source data;
6. correcting language-specific terms and handling typos, misspellings, and errors;
7. streamlining the extraction of information from description texts using predefined expectations for specific data types;
8. addressing the lack of standardized features across different data sources;
9. assessing and cleaning the extracted data to ensure accuracy and consistency;
10. integrating with external data sources to enrich knowledge bases with relevant contextual information;
11. continuously re-training and improving deep learning models and predefined lists based on new data and user feedback;
12. ensuring scalability and performance optimization to handle large volumes of data from various sources efficiently; and
13. implementing robust data security and privacy measures to protect sensitive information and comply with relevant regulations and industry best practices.

Embodiments of the present disclosure can be used in various situations. For example, graduating high school students have hundreds, if not thousands, of colleges to filter down to a handful or a subset for a manageable application process. Information collected or generated about each college continues to grow and can be siloed in think-tanks, magazines, etc. Students' decisions would be better informed if the siloed information were accessible and incorporated into the students' decision-making processes. Thus, embodiments of the present disclosure allow centralizing and enriching data such that students can access most recent information. Embodiments of the present disclosure can be used in other areas as well, for example, collecting data relating to insurance industry to help insurance providers craft risk pools, collecting data relating to mortgages to help compare similar-situated individuals, collecting data relating to academics to help researchers obtain the most recent information (e.g., information from journals, universities, research laboratories, think-tanks, etc.) in their area of expertise.

FIG. 1 illustrates a block diagram of a system 100 for building knowledge bases and enriching databases, according to some implementations of the present disclosure. The system 100 includes a server 102, a client device 104, one or more repositories 106 for storing information, and/or one or more external systems 108 for sourcing input data or providing output data. The server 102 and the client device 104 are computing devices with at least one processor, memory, storage device, and network interface. Examples of the client device 104 include a laptop computer, a desktop computer, a smart phone, a tablet, a phablet, a personal digital assistant (PDA), a smart television, a smart speaker, etc. The server 102 can include one or more computing devices to perform functions described in the present disclosure. The external systems 108 can include other computing systems.

The one or more repositories 106 can store one or more language model parameters 110, one or more sorting features 112, and/or one or more image model parameters 114. The one or more repositories 106 can further include other data stored in a database 116. The one or more repositories 106 can store intermediate calculations and other data used by the server 102. The one or more repositories 106 are computing systems.

The server 102 is configured to receive data or information from the client device 104 and/or the external systems 108. In some implementations, the data received is listing data from a real estate listing agency (e.g., Zillow, Redfin, etc.). In some implementations, the data received is video and/or images from the Internet (e.g., social media sources, news agencies, etc.). The server 102 can store the received data in the repository 106 to update the repository 106. The server 102 can merge data received from various sources to store the data in a more searchable data structure (e.g., a table, a SQL table, etc.) or present the data in a more digestible format (e.g., a graph, an image, a report, etc.). A user of the client device 104 can provide feedback or updates to data stored by the server 102. For example, the user of the client device 104 can provide updates on a number of bedrooms in a listing; add amenities not previously reflected in the listing; delete erroneous details that have been corrected since the original listing; etc. The external systems 108 can be probed by the server 102 at regular intervals (e.g., every few hours, every day, every week, etc.) to refresh information stored in the repository 106. By using multimodal information from different sources, the server 102 can cross-check information across the different, diverse sources to enhance accuracy of information extracted.

The server 102 includes an application programming interface (API) 120, an ingestion engine 122, a reward engine 124, a standardization engine 126, a feature extraction engine 128, a language identification engine 130, a dynamic field management engine 132, a contextual identification engine 134, and/or a regular expression extraction engine 136. Each of the API 120, the ingestion engine 122, the reward engine 124, the standardization engine 126, the feature extraction engine 128, the language identification engine 130, the dynamic field management engine 132, the contextual identification engine 134, and/or the regular expression extraction engine 136 identified in FIG. 1 is a combination of hardware and software configured to perform specific functionality as described in the following paragraphs.

The API 120 of the server 102 facilitates communication between the client device 104 and the server 102. In some implementations, the API 120 also facilitates communication between the server 102 and the one or more repositories 106. In some implementations, the API 210 further facilitates communication between the external systems 108 and the server 102. The API 120 packages data packets to (and from) the client device 104, so that there is a bidirectional information flow between the server 102 and the client device 104. The API 120 can package information (e.g., images, video files, portable document format documents, web inputs, text formats, etc.) received from the client device 104 so that these provided information can be processed by the server 102. The API 120 can package information processed by the server 102 such that the processed information can be shared with or is readable by the client device 104 and/or the external systems 108. In some implementations, the API 120 is a web service compatible with hypertext transfer protocol (HTTP) and machine-readable file formats, such as extensible markup language (XML) and JavaScript object notation (JSON). The API 120 can allow connection to mapping services, market data, and other external databases.

The ingestion engine 122 of the server 102 is configured to receive data streams from the API 120 and/or perform an initial formatting of the data. In some implementations, the initial formatting includes rescaling, normalization, cropping and augmentation for images; frame extraction, temporal sampling, optical flow for videos; tokenization, stop words removal, lemmatization or stemming, removing punctuation and special characters, lowercasing for texts; text extraction and preprocessing as text files for portable document formatted (PDF) files; resampling, spectrogram conversion, noise reduction for audio; resampling, handling missing values, smoothing for time series data; etc.

The reward engine 124 of the server 102 is configured to calculate rewards or points for incentivizing users of the client device 104 to upload and correct information stored in the repository 106. The rewards can be Red Points that are provided to the users of the client device 104 based on specific criteria in the Red Points rewards program. In some implementations, rewards (i.e., the Red Points) can be provided based on the user of the client device 104 populating missing information in the repository 106. For example, the user can add a new amenity (e.g., a swimming pool) for a listing of a house. By adding the new amenity, the reward engine 124 can generate a first reward (e.g., a first number of Red Points). In another example, the user can correct information provided in the listing (e.g., changing 2 bathrooms to 1.5 bathrooms). The reward engine 124 can generate a second reward (e.g., a second number of Red Points). The second reward in some cases can be greater than the first reward. That is, correcting information can be valued higher by the reward engine 124 compared to adding new information. In some implementations, correcting information (or corrective text) can be valued lower by the reward engine 124. In some implementations, rewards generated can be based on category of the information provided. For example, a first reward can be provided for updating or adding a number of bedrooms, and a second reward can be provided for updating or adding a contact information. The second reward can be greater than the first reward based on contact information category being valued more than number of bedrooms category.

The reward engine 124 can be used to power a crowdsourced data validation program. Users of the client device 104 can be enlisted to correct data inaccuracies, thus improving overall data integrity. The information provided by the users of the client device 104 can be confirmed or validated. In some implementations, some users can be designated as having special privileges. For example, brokers that post property listings can have a specific identification compared to a random user. Furthermore, changes from users of the client device 104 can be tagged or tracked. Thus, version history of information stored in the database 116 can be provided for probing. In some implementations, changes from user of the client device 104 or any other corrective text can trigger version control based on whether information is being overwritten such that a current version and previous version is stored in the database 116.

The standardization engine 126 of the server 102 is configured to transform unstructured data types into structured and predictable formats. The standardization engine 126 can receive preprocessed unstructured data from the ingestion engine 122 and populate the database 116. The data inputs to the standardization engine 126 can include files of various formats, video files, PDF documents, images or pictures, JSON format information, web inputs, listing information, government data information (e.g., contracts, land ownership, survey, insurance, etc.), information on hotels, Airbnb, parks data, greenspace footage near a property, demographic information on an area, security and safety information on the area, usage space of a property, address information, etc. The standardization engine 126 leverages algorithms to handle various data representation styles to ensure that the data output is in a structured format. For example, the standardization engine 126 can receive address information as a single input and cast the address information in a defined structured format. In another example, the standardization engine 126 receives the address information as multiple inputs (e.g., a house number, a street, a locale, etc.), and the standardization engine 126 concatenates the multiple inputs into a single item and casts the single item in the defined structured format. Outputs of the standardization engine 126 can be key-value pairs in one or more tables, SQL tables, etc. In some implementations, the keys of the key-value pairs are pre-defined and stored as the sorting features 112. Keys can be categories or concepts, and values can indicate a property or feature associated with the categories. In some implementations, the standardization engine 126 outputs can be structured reports or data structures for interfacing with one or more software applications.

The feature extraction engine 128 of the server 102 is configured to use one or more algorithms to extract information from the preprocessed data of the ingestion engine 122. The parameters for the one or more algorithms are language model parameters 110 stored in the repository 106 and/or image model parameters 114 stored in the repository 106. The language model parameters 110 can be parameters associated with one or more large language models. Large language models can be used to distill features from unstructured data (e.g., descriptions from listings, user-generated content from blog posts, etc.). The feature extraction engine 128 can be used by the standardization engine 126 for parsing unstructured data to obtain information for populating the one or more tables provided by the standardization engine 126.

In some implementations, the feature extraction engine uses simple natural language processing techniques such as bag-of-words, n-grams or term frequency-inverse document frequency for processing and extracting information from the text. These processes may be used in addition to deep learning models that capture semantic and syntactic nuances more efficiently.

In some implementations, the feature extraction engine 128 can use question-answer format for determining which information to extract from preprocessed data. The feature extraction engine 128 can receive as input descriptions of listings (e.g., real-estate listings), documents from insurance companies, documents relating to mortgages, documents relating to banking, documents relating to student loans, documents relating to academics, etc., and one or more questions relating to the information to extract from the documents. In some implementations, the questions include parameters for allowing the large language models to perform additional steps. For example, the question may be "what is the square footage of the largest room in this property?". The document being searched may not include square footage but may include dimensions of the rooms for the property. The inclusion of "square footage" may be a parameter that triggers calculation of an area of different rooms in the property and then selection of the largest area.

In some implementations, one or more questions are provided to the feature extraction engine 128 for extracting the same information. For example, different ways of asking the same question are provided to the feature extraction engine 128. The question that provides the best answer can be upvoted by the feature extraction engine 128 or by a user of the client device 104. By upvote, the feature extraction engine 128 and/or the user of the client device 104 provides an Indication that the question which provides the best answer should be prioritized next time questions are generated for that specific feature. This is one way of narrowing the best ways of determining which questions are best used for extracting which type of information. For example, the following questions can be provided: (a) "how many rooms in this building?"; (b) "this home has how many rooms?"; (c) "how many bedrooms?". In some implementations, the key "rooms" may be too general, and the large language model may generalize and provide answer that includes living room along with bedrooms, thus providing a poor answer. Therefore, the right answer indicating number of bedrooms rather than rooms in general would be preferred. The question (c) can be upvoted over the other two questions after shown to be more representative of extracting the information of interest from multiple documents.

The upvoted questions are ranked higher than questions without an upvote. Furthermore, the number of upvotes on questions can be compared to determine a ranking for the questions, where the questions with the highest number of upvotes are ranked higher than questions with the least number of upvotes. The total number of upvotes a question has can be accumulated over time such that historical information associated with efficacy of the question in extracting a certain feature is captured by the total number of upvotes.

In some implementations, the feature extraction engine 128 can generate questions based on the feature to be extracted. For example, a generic statement or generic question like "how should we ask about the number of bedrooms in this property?" can be used by the feature extraction engine 128 to generate an appropriate question for probing the document. In some implementations, the generic statement or generic question can be provided by the client device 104 to generate the question to be used as input to the large language model. In some implementations, the feature extraction engine 128 determines the question to ask based on keywords in the document. For instance, if the document mentions "bedrooms," "number of rooms," or related terms, the feature extraction engine 128 may generate one or multiple questions, e.g., "How many bedrooms does this property have?" This process is writing-specific and can depend on domain-specific knowledge. The feature extraction engine 128 can select one of many or a subset of questions based on keywords present in the document. The feature extraction engine 128 can craft the question based on the keywords in the document.

The large language models can be pre-trained models (e.g., GPT-4, 1LaMA, PaLM2, BERT, StableLM), domain specific large language models (e.g., real estate specific models, insurance company specific models, student loan specific models, healthcare specific models, physics specific models, mathematics specific models, etc.). In some implementations, answers provided by the feature extraction engine 128 are filtered and provided with a confidence level. For example, if the large language model provides that the number of rooms is 500 rooms, the 500 rooms answer may not pass a magnitude check. That is, the magnitude check may be set to the Order of 10 for bedrooms, thus any answer from the feature extraction engine 128 that returns a value that is significantly larger than 10 is flagged as incorrect or flagged as an outlier. In some implementations, a confidence level of a specific feature can be based on a magnitude associated with the feature, a data-type associated with the specific feature (e.g., whether the data-type for the number of rooms is a number or a letter), etc. The confidence level can be a flag (e.g., a binary flag indicating "no need for manual review" vs. "manual review required", "correct" vs. "incorrect", "ok" vs. "further review", etc.). The confidence level can be quoted as a confidence score (e.g., as a number between 0 and 1 indicating a probability that the feature extraction engine 128 obtained a correct value for the extracted feature).

The feature extraction engine 128 can also work with image models using image model parameters 114. Images included in the preprocessed data of the ingestion engine 122 are provided as inputs to the image models. In some implementations, labels and/or labeled images for training the image models are also provided to the feature extraction engine 128. The images can be grayscale images, black and white images, and/or color images. In some implementations, the images are color images provided as a three dimensional matrix for each image. The feature extraction engine 128 can be used to train the image models to update the image model parameters 114. In some implementations, the image models are convolutional neural networks.

Features identified in images can include amenities (e.g., pools, gyms, laundry, etc.). The training process can include using a large image dataset to train and validate the image models. The large image dataset can be split into training images and testing images. For example, 1,000 images can be included in the dataset with 800 of the images being training images and 200 being testing images. Images can then be swapped at a later time with 800 images being used for testing and 200 images being used for training. Each of the image models can be trained to recognize one or more features. Different image models can be used for different feature recognition in images. The feature extraction engine 128—when working with image models—provides outputs of features in the images and/or accuracy metrics like confidence scores as to whether the feature is included in a specific image.

In some implementations, the feature extraction engine 128 uses a segment anything model to segment images and classify pixels of the images into categories. In some implementations, the segment anything model can be used in the training phase while training image models. For example, generating labels for images can be a tedious, time and resource consuming task, thus the segment anything model can be used to generate labels for items contained in the images. Once those items (or features) are identified, the images are labeled and used for training image models specializing in extracting those identified features. For example, a segment anything model can be used on images to determine whether the images contain swimming pools. Based on labeling some images as containing swimming pools and some images as not containing swimming pools, the image models can be trained to identify swimming pools in images using the labeled images.

The standardization engine 126 can use features identified in pictures by the feature extraction engine 128 to augment or enrich information stored in the database 116. For example, a property listing can include pictures, description of the property, and some amenities or a table of characteristics of the property. The property listing can be ingested by the server 102, and the standardization engine 126 can use the feature extraction engine 128 to match key-value pairs for storing in a table in the database 116. Furthermore, the description of the listing can include more information that are not provided in the table of characteristics of the property. For example, the description can include that the property has in-unit laundry as opposed to a shared laundry room. This standardization engine 126 can use the feature extraction engine 128 along with the language model parameters 110 fill in a "laundry" key in the database 116 as "in-unit." Similarly, the feature extraction engine 128 can use the image model parameters 114 to identify features in the pictures included in the property listing. The identified features can be used to verify amenities, for example, identifying a swimming pool in an image can be used to suggest filling in a "pool" key in the database 116 as "yes." Thus, the server 102 can be used to enrich information stored in the database 116 and improve upon the table of characteristics of the property included in the property listing.

In some implementations, as described above, image features can be determined from images associated with a first item (e.g., a property listing). For example, a swimming pool is an image feature extracted from one or more images associated with a first property listing. Text features can be determined from text associated with the property listing to determine whether the text in the property listing includes a swimming pool. If there are categories (e.g., swimming pool amenity) in the image features missing in the text features, then the missing image feature (i.e., the swimming pool) can be stored in the database 116. For example, as described above, a "pool" key can be indicated as a "yes" in the database 116. Conversely, if there are text features missing in the images and the database 116, the text features can be stored in the database 116. The database 116 can store features in a "yes"/"no" Boolean format or can store features in a more descriptive format (e.g., a square footage associated with the feature).

In some implementations, updated text and/or images can be received at the server 102. The server 102 can determine updated image features associated with the first item based on the updated images, and/or can determine updated text features associated with the first item based on the updated text. For example, an updated image can include a new image showing a different part of a property or a new image showing a part of the property previously captured by a previous image. The server 102 can analyze the updated image to determine whether there are discrepancies associated with stored features associated with the first item. In some cases, the server 102 can prompt the client device 104 to receive input on resolving the discrepancy. In some cases, the server 102 can store the updated image features as stored features associated with the first item. In some cases, the server 102 can create a new category associated with the first item and linking the new category to the image features. In some cases, a confidence level associated with a key or category can be updated based on the image features. For example, a new photograph showing the pool from a different perspective can increase a confidence level associated with the key "pool" while a new photograph showing a pond can reduce a confidence level associated with the key "pool".

The language identification engine 130 of the server 102 is configured to determine the language a document is written in. The language identification engine 130 is used by the standardization engine 126 to identify the language. The identified language can be used by the standardization engine 126 to inform the feature extraction engine 128 on which language model to use. For example, the language model parameters 110 can include parameters for different large language models. The different large language models can be large language models in different languages. The different languages can include English, Spanish, Japanese, Chinese, Portuguese, etc. The language identification engine 130 can use pre-trained language identification models on unstructured data to identify the language. Once language is identified, the feature extraction engine 128 can limit which of the large language models are appropriate.

In some implementations, the language identification engine 130 is configured to determine the language of a document. Once the language is determined, then the ingestion engine 122 can perform language translation using language translation APIs or some other service provided by the external systems 108. This can be advantageous where multiple models do not have to be trained for different languages, but disadvantageous where domain specific information can be lost in translation.

The dynamic field management engine 132 of the server 102 is configured to generate new keys, fields, categories, features, etc. The dynamic field management engine 132 generates the new fields dynamically. In some implementations, the sorting features 112 does not include a specific key, thus a "dump" field is created to house values that do not fit into any of the predefined fields or features in the sorting features 112. The "dump" field can include sentences, paragraphs, etc., of information from the document that the standardization engine 126 has not extracted any information from. For example, the description of a beautiful sunset in a property listing may not be readily imported into the number of bedrooms, number of bathrooms, price of the property, etc. The dynamic field management engine 132 can capture parts of the description relating to the beautiful sunset and store the entire description in a "dump" field for later processing. In some implementations, the dynamic field management engine 132 can find patterns between different documents to create a new field. For example, if multiple documents or descriptions of properties make reference to high ceilings, the dynamic field management engine 132 can create a new field or a new key called "high ceilings" and populate values as "yes." The dynamic field management engine 132 creating a new field can trigger the standardization engine 126 to search "dump" fields of previously processed information to determine whether these fields include descriptions that could provide values for the newly created field. For example, prior to creating the "high ceilings" field, "dump" fields of previously processed property listings are searched to determine whether those fields contain information that can provide insights as to whether those previous properties include "high ceilings." In some implementations, the dynamic field management engine 132 can rely on unsupervised learning methods such as clustering or topic modeling (like Latent Dirichlet Allocation) to identify common themes or features in property descriptions.

In some implementations, the dynamic management engine 132 can create a new field or category based on search query. For example, based on a frequency of keywords searching for a specific item, the dynamic management engine 132 can determine that the keyword represents a field or category. For example, the database 116 previously did not include a category for "glass doors" for the stored property listings. After a number of users of the client device 104 search for "glass doors" then the dynamic management engine 132 can create a new category in all stored property listings for "glass doors". In some implementations, the new category is created after a number of searches reach a search threshold within a time period (i.e., a number of searches over a time period or a frequency of searches). For example, 300 searches of the keyword within three days. The dynamic management engine 132 creating the new category can trigger the standardization engine 126 to search "dump" fields of previously processed information to determine Boolean values for "glass doors" for each of the stored property listings.

The dynamic field management engine 132 can be used with images as well. For example, the sorting features 112 can be updated to include a new amenity, category, key, feature, etc. If the images for already processed listings are stored in the database 116, then the feature extraction engine 128 can reprocess those images using the image model parameters 114 for identifying which images include the new feature.

The contextual identification engine 134 of the server 102 can use context-based feature extraction from description text or document text to identify and extract relevant features, keys, amenities, etc. For example, the contextual identification engine 134 can identify all nouns in the document text and classify the different nouns as features. The contextual identification engine 134 can assume all nouns are features (e.g., amenities). The contextual identification engine 134 can identify parts of speech, and based on the parts of speech, can define keywords. The keywords can, for example, be used by the dynamic field management engine 132 to determine new fields, the feature extraction engine 128 for generating questions based on keywords as described above, etc. In a real estate listings example, the contextual identification engine 134 can be used alongside the dynamic field management engine 132 to extract new amenities not previously encountered. New amenities or keywords can be used to update the sorting features 112. This enables the sorting features 112 to be changed or to be updated over time.

The regular expression extraction engine 136 of the server 102 can be used by the standardization engine 126 for matching regular expressions in text descriptions. In an example, the feature extraction engine 128 can use a large language model 110 to develop an answer or response to a question. The regular expression extraction engine 136 can match the answer to regular expressions as a method of checking correctness. For example, if answers to an area of a property should be in square footage or an area of land should be in acreage, then the answer provided by the feature extraction engine 128 using the large language model 110 should include the expected units. In some implementations, the regular expression extraction engine 136 is used directly on text descriptions to reduce computational complexity and processing time. For example, if a property listing includes a table of characteristics like the number of bedrooms, price, etc., then matching the currency can provide a quick way of extracting price from the text and matching "bedrooms" can provide a quick way of extracting a number in the vicinity of bedrooms. In some implementations, specific idioms or domain-specific language can be lifted or matched directly. In some implementations, the regular expression extraction engine 136 can use string matching and/or rely on heuristics based on keyword density.

Figure 2:
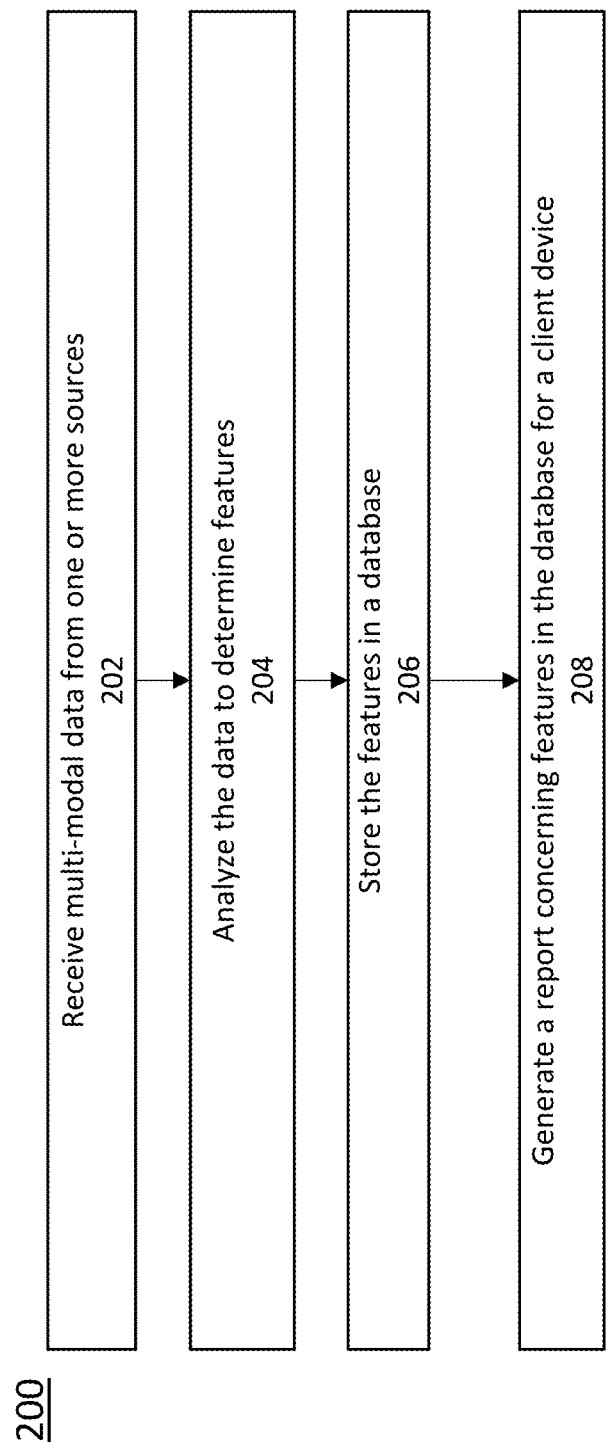
FIG. 2 is a flow diagram illustrating steps of a process for building knowledge bases and providing information to client devices, according to some implementations of the present disclosure.

Referring to FIG. 2, a process 200 for building knowledge bases and enriching databases is provided, according to some implementations of the present disclosure. The process 200 can be performed by the system 100, and in some cases by the server 102 in cooperation with the repository 106. At step 202, the server 102 can receive multi-modal data from one or more data sources. As described above in connection with FIG. 1, the multi-modal data can be obtained from the external systems 108 and/or the client device 104. The data can be video, text, images, etc.

At step 204, the server 102 analyzes the received data to determine features. The standardization engine 126 in cooperation with different engines of the server 102 can analyze the data to determine one or more features present in the received data.

At step 206, the server 102 stores the features in the database 116. As described above in connection with FIG. 1, the database 116 can include key-value pairs where values for pre-defined keys are populated using features extracted from the received data. The feature extraction engine 128, the language identification engine 130, the dynamic field management engine 132, the contextual identification engine 134, and/or the regular expression extraction engine 136 can be leveraged in extracting features.

At step 208, the server 102 generates a report concerning features in the database 116 for displaying on the client device 104. The report can be published as a web result. Thus, the server 102 can update information in the report as new data is available, regardless of the mode or format of the new data.

Embodiments of the present disclosure can enable various applications. For example, in a real estate property listing context, certain advantages can be identified. The server 102 can implement a comprehensive data extraction, processing, and enrichment pipeline that leverages advanced machine learning techniques, robust data cleaning protocols, and integrations with external data sources to deliver high-quality, standardized property listing data. The standardization engine 126 can parse real estate listing data. The standardization engine 126 can utilize a variety of algorithms, each tailored to extract a specific type of information such as address, phone numbers, amenities etc. These algorithms utilize regular expressions and machine learning techniques to parse unstructured text and identify recurring patterns from data sources.

The standardization engine 126 can leverage the feature extraction engine 128 to perform image analysis and extract information from images. Convolutional neural networks can allow labeling and categorizing images related to real estate listings. Through the use of feature extraction and image clustering, similar images can be grouped together to identify key amenities such as pools, views, etc.

The server 102 can facilitate amenity extraction by linking images in the database 116 to their corresponding amenities, providing a comprehensive resource for the image models to learn from. Deep learning models that can work with multi-lingual data can be used, allowing for more comprehensive amenity detection across a variety of listing descriptions.

The server 102 facilitates model training. Using information stored in the database, neural networks can be trained to recognize patterns and categorize real estate listings based on their amenities. This training involves iterative adjustments to the models' attributes, minimizing possible values until the models' outputs align with expectations. The model can be stored in the image model parameters 114.

Trained image and language models can be used the feature extraction engine 128 for classifying new listings. The trained models can facilitate classifying new listings, storing the output in a structured form that includes both the listing and the detected amenities. The models can suggest improvements to the listing, such as prompting the user of the client device 104 to add images of amenities mentioned in the description but not shown in the images.

The server 102 allows for data verification by cross-verifying the extracted data with external official sources like transaction records and permits. This can be performed by comparing geographical information and property details from these sources with the information in our listings. Transactions come from official sources (e.g., lease documents, government records, commercial sources, etc.). The information in these transaction documents can be cross-checked against information provided by brokers, websites, etc. For example, a property listing provided by a broker can say the property is an apartment, and the server 102 can use official sources to confirm this information. Furthermore, cross-checking can allow confirming whether a specific space was previously used as an operating business based on business registration. Transaction information can be used for augmenting the information in the listing.

In some implementations, cross-verifying the extracted data with external official sources can help reduce an amount of information stored by the server 102. For example, information from more reliable sources can be used to replace information from less reliable sources. That way, for a certain feature, the server 102 can remove the information from less reliable sources to conserve storage space. In some implementations, information is stored along with a source identifier, and as property details are populated for a certain listing over time, the source of the property details is readily available. In some implementations, instead of a source identifier, a confidence score associated with the source of the property details is stored alongside the property details.

In some implementations, the source identifier can be used to deal with duplicate information obtained from different sources. For example, information from a more trusted source identifier can be retained while information from a less trusted source identifier can be deleted or de-indexed. For example, a broker providing information for a number of bedrooms is more reliable than an anonymous user providing the information. Information from the broker can replace information provided by the anonymous user based partially on the source identifier for the broker being more trustworthy than the source identifier for the anonymous user. Therefore, search results returning, for example, the number of bedrooms will provide results associated with information obtained by the broker instead of the anonymous user.

Source identifiers can be used to replace an amount of information stored in the database by only retaining the most reliable information. In some cases, the less reliable information is deleted from the database 116. In some cases, the less reliable information is compressed and de-indexed. De-indexing prevents the information from showing up in search results, but the information can be retained in a compressed state for version control purposes.

In some implementation, the feature extraction engine 128 uses natural language processing models to process and simplify text descriptions. For example, the natural language processing models can be used to summarize long text to improve efficiency of extracting information from the text. In some implementations, preprocessing steps by the ingestion engine 122 and/or preprocessing steps by the feature extraction engine 128 and/or the standardization engine 126 can be used to data cleanse, thus simplifying text, removing unnecessary words and providing a more condensed, useful output from the standardization engine 126. In some implementations, traditional machine learning models are used instead of/or in addition to deep learning models. Traditional machine learning models include decision trees, support vector machines, or k-nearest neighbors.

The reward engine 124 can be used to incentivize users to upload and correct data. The Red Points can be provided to users to incentivize their addition or correcting information provided in listings. This not only increases the quantity of data for use by the language and the image models to learn from but also improves the accuracy of the listing information in the database 116.

The server 102 is configured to utilize multi-modal machine learning algorithms that can handle different types of data sources, including text, images, and structured data. The server 102 can apply specific models for each type. This allows the creation of "super listings" that combine data from various sources into a single comprehensive listing. In some implementations, as new information becomes available, the "super listing" is updated in real-time. The server 102 enables easier path to scalability and optimization, being capable of handling large volumes of data and continuously improving based on new data and user feedback.

The server 102 enables data enrichment of the information stored in the database 116. Listings are further enhanced by integrating them with external data sources (e.g., from the external systems 108) that provide relevant contextual information, such as market trends or demographic data.

Data Security and Compliance: Robust measures are implemented to protect sensitive information and ensure compliance with relevant data protection regulations and industry best practices. In some implementations, encryption techniques are used to safeguard data both stored in the repository 106 and/or in transit to any component in the system 100 (e.g., the client device 104). The encrypted data can only be accessed with the appropriate decryption keys. In some implementations, personally identifiable information (PII) is anonymized to further protect individual privacy, which involves removing or altering identifiable information.

In some implementations, listing information or results from reviews of a property or a neighborhood can be used to perform sentiment analysis by the server 102. The large language models can be trained to analyze the sentiment of the reviews and comments related to the listings or specific multi-unit properties. This helps in gauging the perceived value and reputation of the one or more properties.

The server 102 can employ statistical models (e.g., automated valuation models (AVM)) to estimate the market value of a property. The models use the data points extracted from the listings and local market data to make these estimations. When price information is unavailable for a specific property, the AVM can be used to provide users estimates based on the property's locale.

In some implementations, the report generated by the server 102 can take advantage of geocoding. That is, geocoding services can be used to convert addresses into geographic coordinates. The geographic coordinates enable plotting the listings on a map to perform spatial analyses, which enables visualizing, for example, the proximity of listings to various points of interest. These points of interest include schools, hospitals, parks, and/or transportation hubs. Spatial analyses can be used to identify areas with high concentrations of properties or regions with similar characteristics using spatial clustering. Spatial analyses can be used to interpolate data between known points to estimate values at unmeasured locations using spatial interpolation. Spatial analysis can help identify trends, patterns, and relationships within the data based on geographical location. Examples include distance calculations, hotspot analysis, and clustering.

In some implementations, the map can be segmented into one or more regions. The regions can have scores associated therewith. For example, a first region including a school, hospital, and parks within walking distance can have a first score, and a second region including a school and parks within walking distance can have a second score. The first score can be higher than the second score based on the first region including a school and the second region not having a school. The scores associated with the regions can be based on a summation of composite scores of public and/or private amenities. For example, a composite score can be associated with grocery stores, public transportation, hospitals, restaurants, churches, gyms, farms, new construction, etc. In some implementations, composite scores can be negative values that subtract from the score associated with a region. For example, land situated in a flood zone can have a negative composite score.

Figure 6:
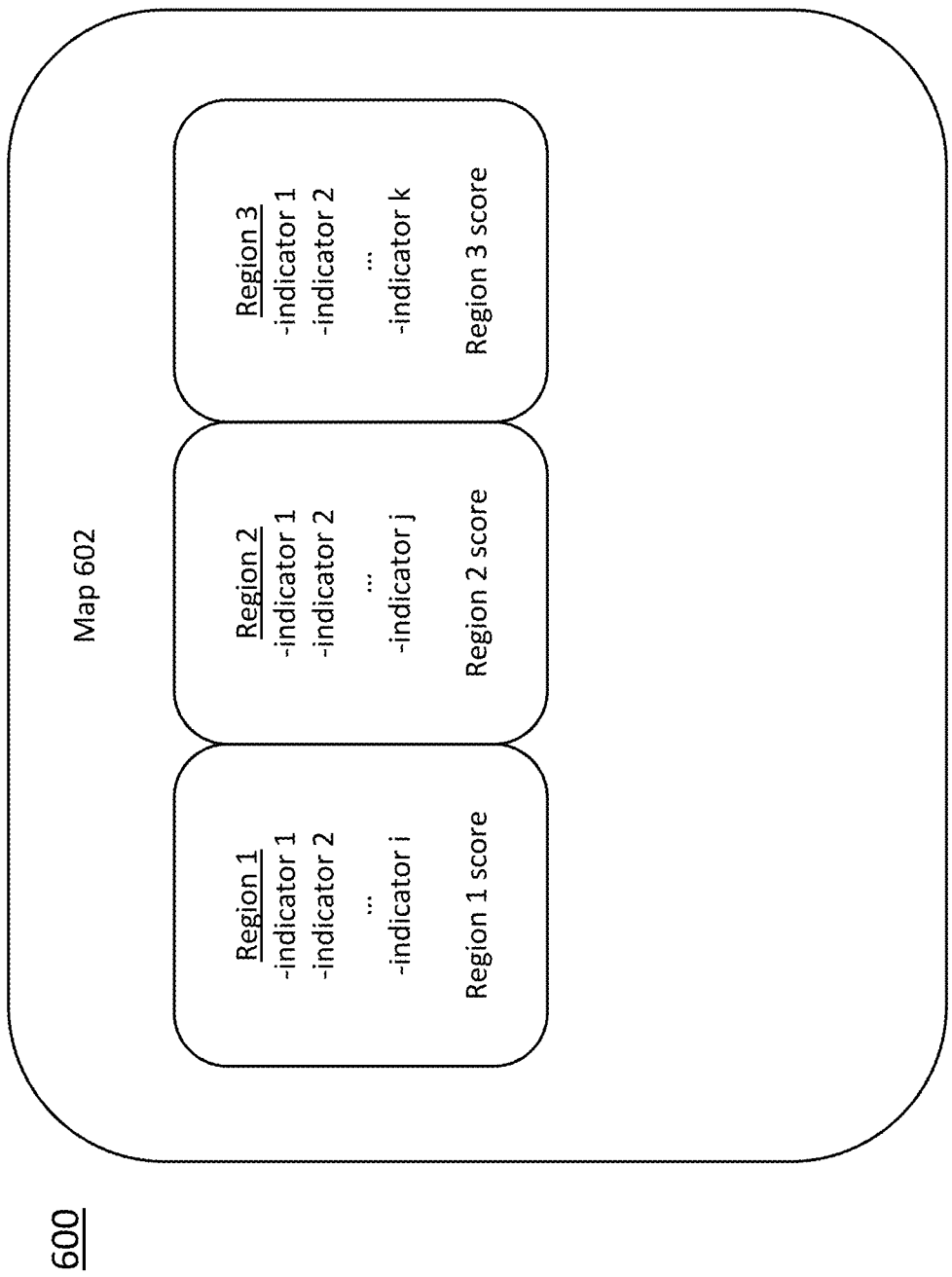
FIG. 6 is a block diagram showing information associated with regions of a map, according to some implementations the present disclosure.

In some implementations, FIG. 6 provides a block diagram 600 for comparing regions. The block diagram 600 is indicative of a region map where information provided in the block diagram 600 can be viewed on a map, a table, or some other graphical interface. The block diagram 600 includes a map 602. The map 602 is indicative of an area, for example, a city, a county, a neighborhood, an area defined by a specific surface on a map, etc. Qualities associated with region 1 can be identified using indicators 1 through i. For example, indicator 1 can be a hospital, indicator 2 can be a school, indicator 3 can be a park, etc. Overall score associated with region 1 is identified as "Region 1 score". In some implementations, composite scores associated with each indicator can be included as well. A similar description can be made for region 2 and region 3.

In some implementations, regions of the map can be determined based on a search query. For example, the search query including "New York City" will trigger the map of New York to be segmented into regions. In another example, the search query including a specific address can trigger the specific address to become a center of one region. Shapes of regions can be based on keywords such as "walkable." Walkable can be defined as two miles from a center, in some instances. In some implementations, a region corresponds to a single property and covers an area of the map including the single property. In some implementations, regions of the map can be determined based on amenities. For example, the regions can be segmented based on hospitals in a city such that each region only contains one hospital. In some implementations, regions on the map can be determined based on prices associated with property listings. For example, properties of similar prices tend to be situated together, therefore, an area having similar property prices can be grouped together as a single region. Outliers can be ignored when making such groupings.

In some implementations, floorplans can be used to determine space utilization. For example, positions of stairs, hallways, columns, etc., can be used to calculate an effective space that a user can truly access or utilize in a property. For example, depending on the width of a hallway, the user may not be able to store or place items in the hallway. Depending on the location of the stairs, specific areas around or underneath the stairs are unusable by the user. Thus, although the listing may have a specific square footage listed, the server 102 can identify features in the floorplan to adjust the square footage and provide an effective space square footage that indicate usable space within the property's floorplan that the user may actually use. In some implementations, the effective space is divided into indoor/outdoor, and if the square footage in the listing includes the outdoor or patio space, then the effective space can list the effective space of the patio separately from the effective space underneath the roof of the property. As provided, the server 102 can perform calculations to determine the usable and/or unusable space with information extracted from the multi-modal data.

In some implementations, the reports created include interactive dashboards and reports that present the processed data in a user-friendly manner. Users of the client device 104 can filter, sort, and visualize the data in various ways. In some implementations, the reports created can focus on one specific region, can focus on a group of regions, or can contrast two or more regions. In some implementations, based on a score associated with a region, the server 102 can suggest one or more features for improving the region. For example, based on new construction within a region, the server 102 can suggest what types of amenities would improve the score associated with the region. In some implementations, the server 102 can compare a first region to a similarly situated region, a second region. The server 102 can suggest amenities in the second region that are missing in the first region in order to improve the score associated with the first region.

In some implementations, version control can be used not just for information stored in the database 116, but version control can be used to track changes to codebase and one or more of the models stored as the language model parameters 110 and the image model parameters 114. Version control can also be used to track changes in the sorting features 112. Tracking changes to the models ensures reproducibility and accountability in the development process to allow for reversion of changes if a model gets overtrained or exhibits new errors due to an evolutionary mistake. In some implementations, version control can be used to monitor models of the system 100. Continuously monitoring machine learning models ensure their performance and accuracy. Models can be monitored by tracking key metrics and regularly retraining the models with new data. These metrics can change according to the task of interest. In some implementations, the metrics can include accuracy, precision, recall, F1 score, Area Under the Curve (AUC), Mean Absolute Error (MAE) or Mean Squared Error (MSE), Receiver Operating Characteristic (ROC) curve, confusion matrix, validation loss, or any combination thereof.

Embodiments of the present disclosure are compatible with continuous integration/continuous deployment (CI/CD) development practices. CI/CD practices can be used to automate the testing and deployment of the codebase and the models to ensure the server 102 is always running the latest and most efficient versions. Similarly, A/B testing is supported, allowing for regularly conducting A/B testing to compare different versions of models to identify the most effective solutions for extracting information from the different data sources.

Furthermore, anomaly detection algorithms can be employed to identify and flag any unusual behavior or data within the system 100. In some implementations, anomaly detection algorithms can monitor the performance metrics of the deployed models in real-time. Sudden drops in accuracy, unusual prediction patterns, or unexpected variations in model behavior can be flagged as anomalies for further investigation. In some implementations, anomaly detection algorithms can assess if there are significant changes in the distribution or characteristics of the input data compared to the data on which the model was trained. Deviations from expected data patterns can indicate data drift, triggering alerts or the need for model retraining or recalibration. This can help in maintaining the integrity and security of information stored in the repository 106. Data governance policy can be enforced on the server 102 to ensure that extracted data is accurate, reliable, and used appropriately. This includes regular audits and the use of data quality management tools.

In some implementations, the server assesses and cleans the extracted data using data validation libraries and traditional data cleaning methods such as removing outliers and handling missing values through imputation. In some implementations, for integrating with external data sources, traditional ETL (Extract, Transform, Load) techniques are used.

In some implementations, to handle scalability and performance optimization, the server 102 uses batch processing instead of real-time processing, or relies on traditional database management systems instead of distributed computing frameworks like Hadoop or Spark.

Instead of using AI for image recognition, simpler image processing techniques such as edge detection, color histogram comparisons, or template matching could be used to extract information from images. However, these methods might not be as effective in recognizing complex patterns and objects.

In some implementations, the server 102 can resolve conflicts or inconsistencies in data from different sources by employing traditional statistical techniques like hypothesis testing or chi-square tests to identify significant differences between extracted features from different sources. In some implementations, sources of data are prioritized. For example, information from a property listing site is prioritized over information from a blog post.

In some implementations, the server 102 corrects simple errors like typos, misspellings, and errors in the listing data using a spell check or grammar check function.

In some implementations, instead of identifying property types and subtypes through text analysis, the server 102 can rely on categorization provided by the listing source. In some implementations, the server 102 relies on other methods to cross-check property type information across diverse sources. The server 102 can retrieve property type information from the description text when available, enhancing the accuracy of property classification. Property type information includes commercial property, residential property, etc.

Embodiments of the present disclosure provide a system for building a knowledge base (see e.g., FIGS. 1 and 2 and accompanying description). The system is configured to receive multi-modal data from one or more sources. The system can analyze the multi-modal data to determine features. Features, in this case, can be values associated with predefined keys or categories (e.g., "bedroom"), or can be values associated with newly identified keys (e.g., "high ceiling"). The determined features can be stored in a database, for example, in a key-value pair. In some implementations, the determined features are indexed for searching.

The system can receive a search query for searching stored features. The search query can be a textual search in sentence format, a paragraph format, or a sentence fragment. For example, the search query can include an address, a zip code, a price range, a number of bedrooms, etc. The search query can be analyzed using a large language model to extract search features. For example, if the search query is in sentence format, a series of pre-approved questions along with the search query can be provided to a large language model. Answers to the series of pre-approved questions are the search features. In some cases, if the answers to the questions returns an invalid response, then the information is deemed to not be included in the search query.

For example, the search query provided can be "find an apartment in New York City in the price range of $700 k to $1.5 million," and the pre-approved questions include: (a) "how many bedrooms?" (b) "what is the price range?" (c) "what zip code?" (d) "what city?" (e) "what type of unit?"

(f) "what amenities?" The large language model may not provide meaning results for questions (a) and (f) for the example search query. Therefore, the extracted search features from the search query can include "New York City", one or more zip codes associated with New York City, "$700 k to 1.5 million", and "apartment". These extracted features can be used to set limits and/or preferences for searching the database for specific properties. Search criteria such as number of bedrooms and amenities would have no preferences.

Figure 3:
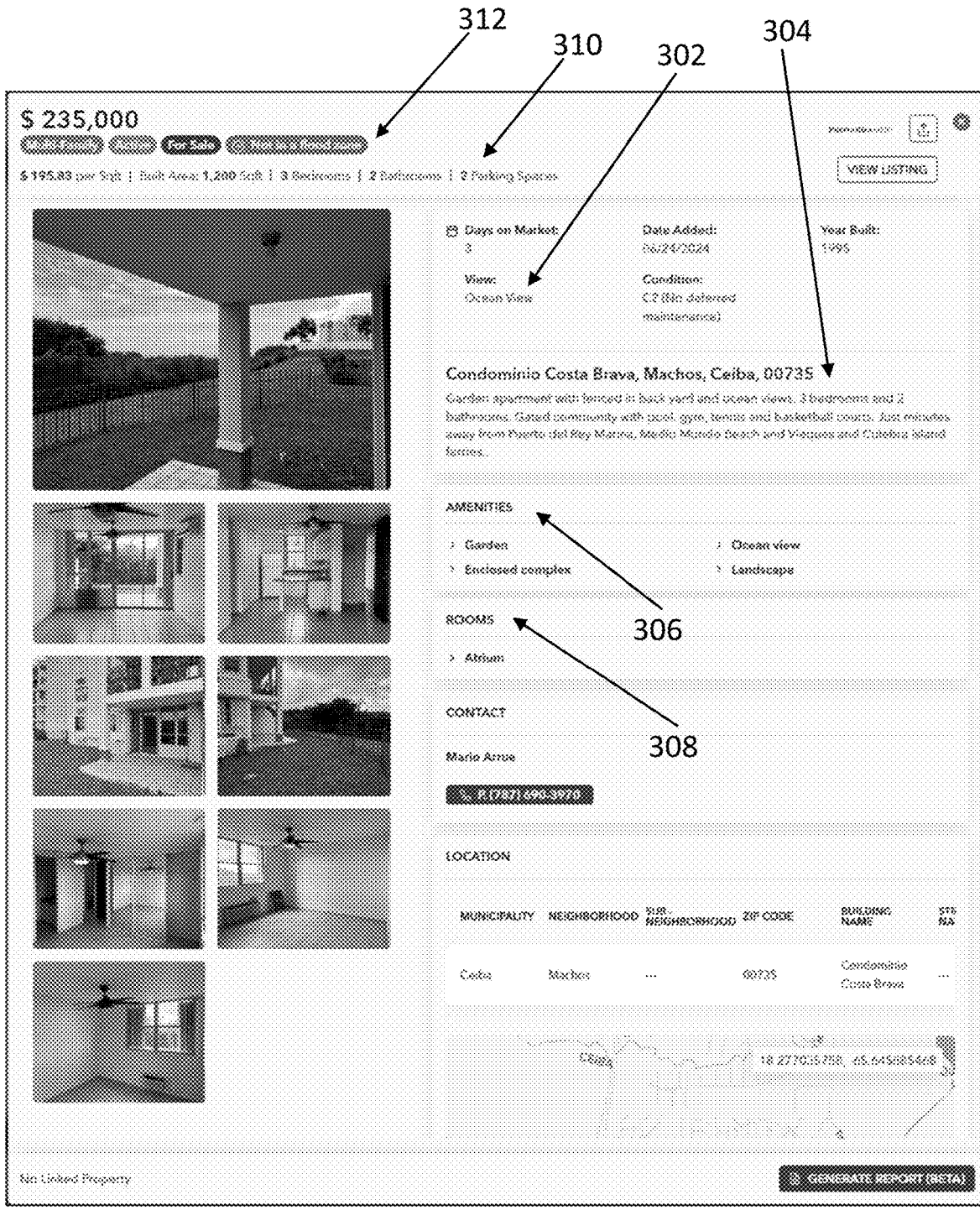
FIG. 3 is a first graphical user interface, according to some implementations of the present disclosure.
Figure 4:
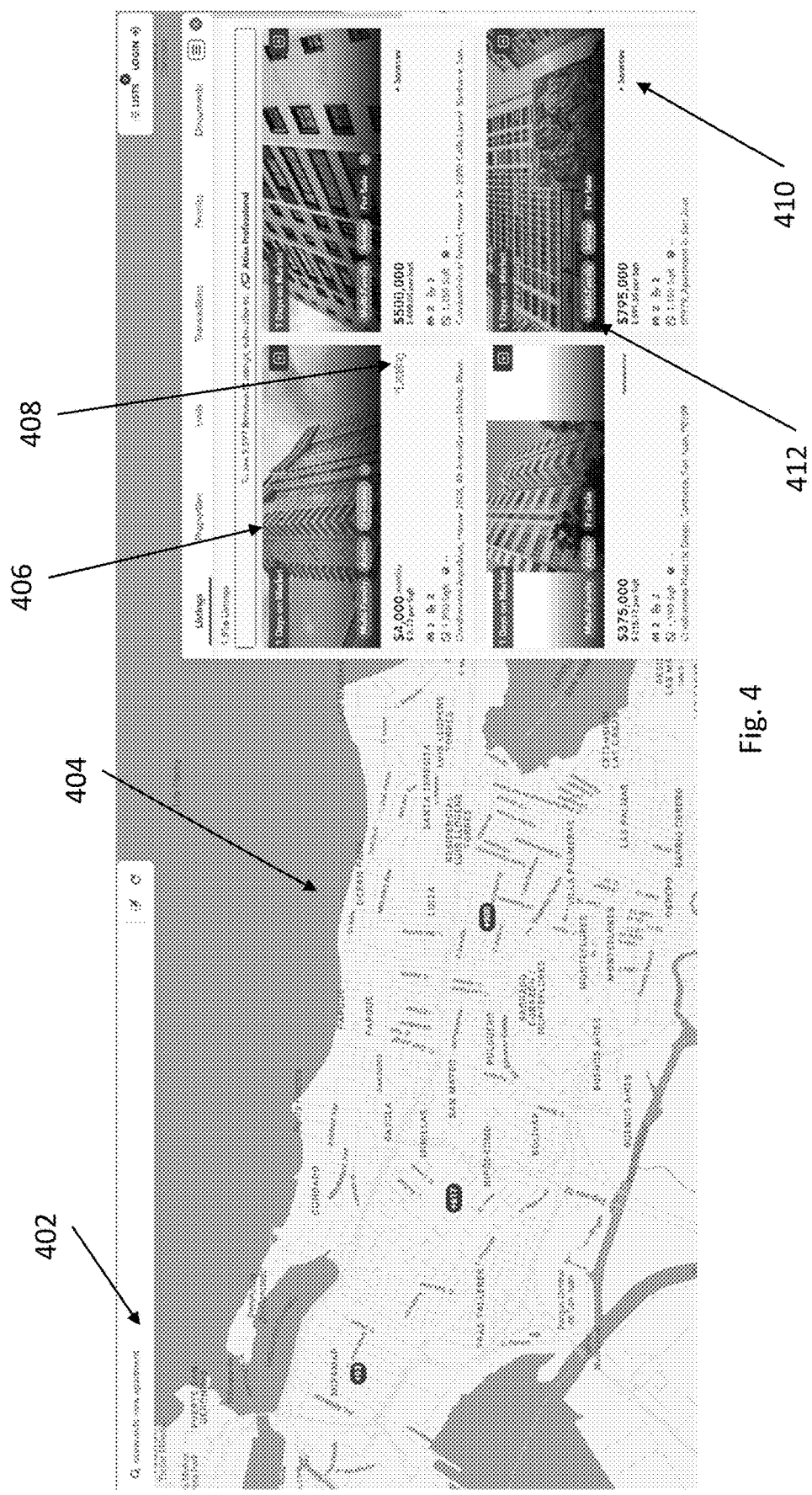
FIG. 4 is a second graphical user interface, according to some implementations of the present disclosure.

After the search results are generated, the results can be displayed on a standardized graphical user interface (GUI). The standardized GUI includes a legend having at least one or more of the search features displayed. In an example, a first GUI is provided in FIG. 3 showing an example property listing. In the first GUI, a legend 312 is provided. The legend 312 includes examples "multi-family", "active", "for sale", "not in a flood zone". The legend 312 can have different colors or indicators for the different search features. The first GUI further provides additional qualities 310 which include examples of price per square foot, built area of the property, number of bedrooms, number of bathrooms, number of parking spaces, etc. In some implementations, the first GUI further provides a section on amenities which can be obtained from image and/or text extraction as discussed herein. For example, amenities 306 includes garden, ocean view, enclosed complex, and landscape. In some implementations, the first GUI provides further description of features associated with rooms. Rooms 308 includes a description that there is an atrium style room.

In some implementations, search results can be provided in a map view in a second GUI where a search text 402 of "oceanside view apartment" returns a map 404 of an area along with listings. The listings are overlaid on the map 404 and shown in a gallery view. The gallery view has a property picture 406, a source 408 associated with a specific property, a legend 412 overlaid on the property pictures. In some implementations, information is obtained from more than one source, and multiple sources 410 is used as such indication. The search text 402 "oceanside view apartment" is parsed by the server 102 to obtain the feature "multi-family" and showing properties that include the feature "ocean view". Features that are not restricted are, for example, "for lease" or "for sale", thus search results including properties for sale and properties for lease are provided. Furthermore, properties in a flood zone vs. not in a flood zone are provided as well.

Figure 5:
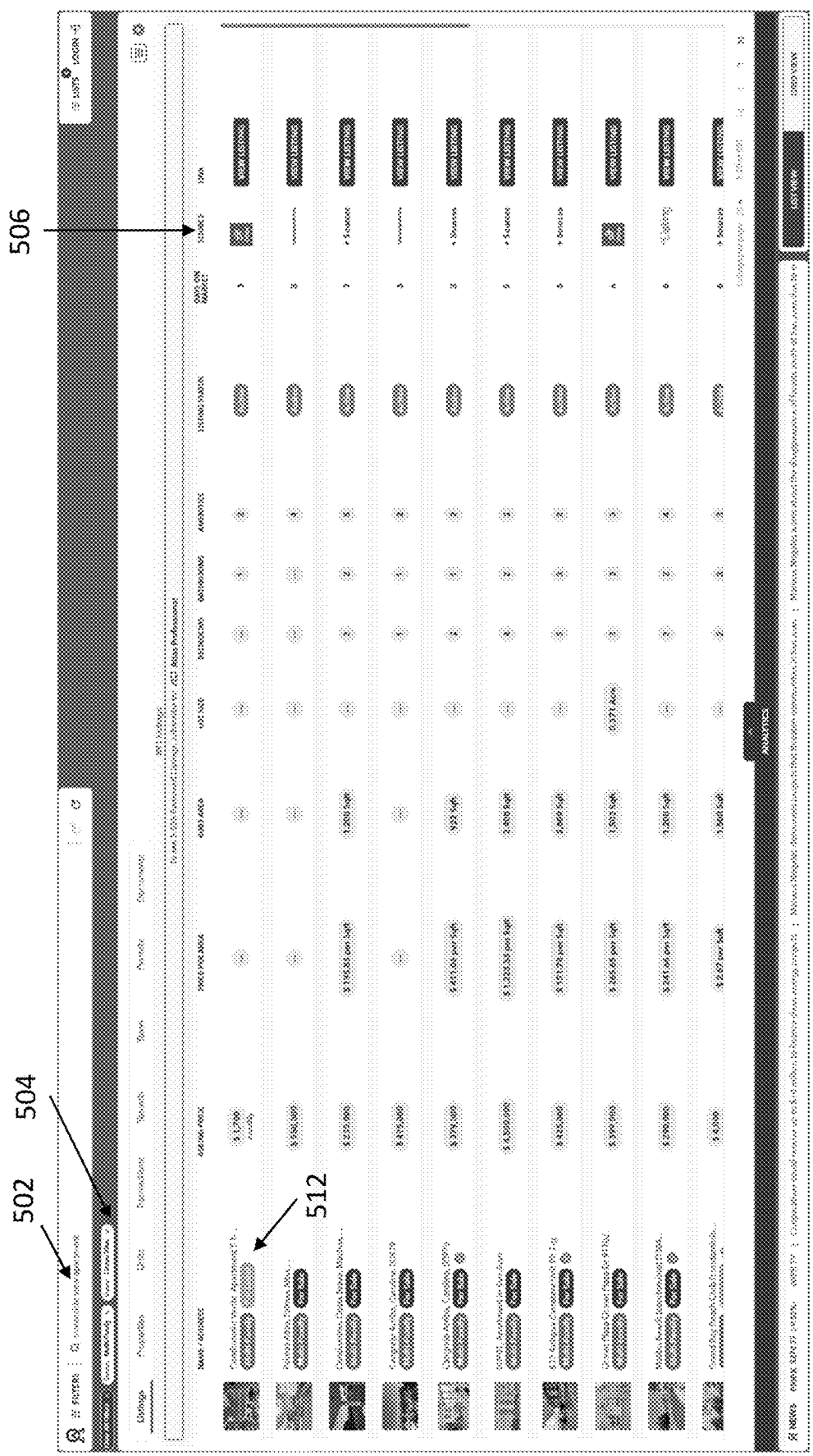
FIG. 5 is a third graphical user interface, according to some implementations of the present disclosure.

Referring to FIG. 5, a more detailed listing can be provided in a third GUI. Search text 502 "oceanside view apartment" is used to set filters 504 displaying "multi-family" and "ocean view". Legends 512 include features associated with the properties in the search results, allowing for quickly identifying qualities associated with each of the listed properties. "Asking price"; "price per area"; "built area"; "lot size"; "bedrooms"; "bathrooms"; "amenities" indicating number of amenities; "listing status" indicating active, contingent, inactive, etc.; "days on market"; source 506 identifying single and multiple sources; and "link" for viewing the listing are provided. In some examples, "price per area" is a created category based on "built area".

According to some embodiments of the present disclosure, processes described above with reference to flow charts or flow diagrams (e.g., in FIG. 2) may be implemented in a computer software program. For example, some embodiments of the present disclosure include a computer program product, which includes a computer program that is carried in a computer readable medium. The computer program includes program codes for executing the process 200. The computer program may be downloaded and installed from a network (e.g., the Internet, a local network, etc.) and/or may be installed from a removable medium (e.g., a removable hard drive, a flash drive, an external drive, etc.). The computer program, when executed by a central processing unit implements the above functions defined by methods and flow diagrams provided herein in the present disclosure.

A computer readable medium according to the present disclosure may be a computer readable signal medium or a computer readable storage medium or any combination of the above two. Examples of the computer readable storage medium may include electric, magnetic, optical, electromagnetic, infrared, or semiconductor systems, elements, apparatuses, or a combination of any of the above. More specific examples of the computer readable storage medium include a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above.

The computer readable storage medium according to some embodiments may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

A computer program code for executing operations in the present disclosure may be compiled using one or more programming languages or combinations thereof. The programming languages include object-oriented programming languages, such as Java or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or electronic device. In the circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. Each of the blocks in the flow charts or block diagrams may represent a program segment or code that includes one or more executable instructions for implementing specified logical functions. It should be further noted that, in some alternative implementations, the functions denoted by the flow charts and block diagrams may also occur in a sequence different from the sequences shown in the figures. For example, any two blocks presented in succession may be executed substantially in parallel, or sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

Engines, handlers, generators, managers, or any other software block or hybrid hardware-software block identified in some embodiments of the present disclosure may be implemented by software, or may be implemented by hardware. The described blocks may also be provided in a processor.

While the present disclosure has been described with reference to one or more particular implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A system for building a knowledge base, the system comprising a processor and a non-transitory computer readable medium storing instructions such that when the instructions are executed by the processor, the system is configured to:
   receive multi-modal data from one or more sources, the multi-modal data including text data, wherein the multi-modal data is associated with one or more real properties;
   analyze the multi-modal data to determine features associated with the one or more real properties;
   store the features associated with the one or more real properties in a database;
   receive, from a user, a search query for searching the database for the stored features associated with the one or more properties;
   identify, from the search query via natural language processing, search features;
   generate, based on the search features, search results, wherein the search results include two or more real properties from the one or more real properties;
   segment, based on the search results, a map into a plurality of regions;
   calculate, based on the features stored in the database, scores for each of the two or more real properties;
   generate, based on the search results and the scores for each of the two or more real properties, a standardized graphical user interface including (i) the map including indications of the plurality of regions and the scores for each of the two or more real properties, (ii) a legend including at least one or more of the search features, and (iii) features associated with at least one of the two or more real properties.

2. The system of claim 1, wherein the graphical user interface further includes indications on the map showing one or more points of interest.

3. The system of claim 1, wherein the for each of the two or real properties are calculated based on a proximity of amenities to each of the two or more real properties.

4. The system of claim 1, wherein the map is segmented further based on the search query.

5. The system of claim 4, wherein the search query includes keywords.

6. The system of claim 1, wherein the map is further segmented based on the amenities.

7. The system of claim 1, wherein the map is segmented further based on prices provided in the stored features.

8. The system of claim 1, wherein the scores for each of the two or more real properties are determined based on features included in a corresponding one of the plurality of regions.

9. The system of claim 1, wherein the system is further configured to generate a report comparing each of the plurality of regions on the map.

10. The system of claim 9, wherein each of the plurality of regions covers an area of the map including a single real property.

11. The system of claim 9, wherein the system is further configured to generate one or more features for improving at least one of the plurality of regions on the map.

12. A method for building a knowledge base, comprising:
   receiving multi-modal data from one or more sources, the multi-modal data including text data, wherein the multi-modal data is associated with one or more real properties;
   analyzing the multi-modal data to determine features associated with the one or more real properties;
   storing the features associated with the one or more real properties in a database;
   receiving, from a user, a search query for searching the database for the features associated with the one or more properties;
   identify, from the search query via natural language processing, search features;
   generating, based on the search features, search results, wherein the search results include two or more real properties from the one or more real properties;
   segmenting, based on the search results, a map into a plurality of regions;
   calculating, based on the features stored in the database, scores for each of the two or more real properties;
   generate, based on the search results and the scores for each of the two or more real properties, a standardized graphical user interface including (i) the map including indications of the plurality of regions and the scores for each of the two or more real properties, (ii) a legend including at least one or more of the search features, and (iii) features associated with at least one of the two or more real properties.

13. The method of claim 12, wherein the score for each of the two or real properties are calculated based on a proximity of amenities to each of the two or more real properties.

14. The method of claim 12, wherein the graphical user interface further includes indications on the map showing one or more points of interest.

15. The method of claim 12, wherein the map is segmented further based on the search query.

16. The method of claim 15, wherein the search query includes keywords.

17. The method of claim 14, wherein the map is segmented further based on the amenities.

18. The method of claim 12, wherein the map is segmented further based on prices provided in the stored features.

19. The method of claim 12, wherein the scores for each of the two or more real properties are determined based on features included in a corresponding one of the plurality of regions.

20. The method of claim 12, further comprising generating a report comparing each of the plurality of regions on the map.

* * * * *